US010678891B2

(12) United States Patent
Tronel (10) Patent No.: US 10,678,891 B2
(45) Date of Patent: Jun. 9, 2020

(54) METHOD FOR THE IDENTIFICATION OF SECURITY PROCESSORS (71) Applicant: VIACCESS, Paris la Defense (FR)

(72) Inventor: Bruno Tronel, Croissy-sur-Seine (FR)

(73) Assignee: VIACCESS, Paris la Defense (FR)

(*) Notice: Subject to any disclaimer, the term of this patent is extended or adjusted under 35 U.S.C. 154(b) by 219 days.

(21) Appl. No.: 15/779,351

(22) PCT Filed: Nov. 24, 2016

(86) PCT No.: PCT/FR2016/053065
§ 371 (c)(1),
(2) Date: May 25, 2018

(87) PCT Pub. No.: WO2017/089705
PCT Pub. Date: Jun. 1, 2017

(65) Prior Publication Data
US 2018/0307807 A1 Oct. 25, 2018

(30) Foreign Application Priority Data

Nov. 27, 2015 (FR) ...................................... 15 61518

(51) Int. Cl.
G06F 21/10 (2013.01)
H04N 21/237 (2011.01)
(Continued)

(52) U.S. Cl.
CPC ............ *G06F 21/10* (2013.01); *H04N 21/237* (2013.01); *H04N 21/2541* (2013.01);
(Continued)

(58) Field of Classification Search
CPC ............ G06F 21/10; G06F 2221/0742; H04N 21/237; H04N 21/2541; H04N 21/26606
(Continued)

(56) References Cited

U.S. PATENT DOCUMENTS

2009/0323949 A1 12/2009 Chieze et al.
2010/0228971 A1* 9/2010 Carles ............... H04N 21/26613
713/163

(Continued)

OTHER PUBLICATIONS

Griwodz, "Protection VoD the Easier Way", Sep. 1998, ACM Multimedia, pp. 1-8 (Year: 1998).*

*Primary Examiner* — Alexander Lagor
*Assistant Examiner* — Gregory A Lane
(74) *Attorney, Agent, or Firm* — Occhiuti & Rohlicek LLP (57) ABSTRACT The invention relates to a method for the identification of security processors in a system for delivering protected multimedia content, in which: upon request from an identification device, a network head-end transmits (136) a command to suspend a first identified pre-determined security processor which, in response, switches (136) from an active state to an idle state; the sharing server detects (120) that the first security processor is in the idle state and then transmits (120) access control messages to a second security processor instead of the first security processor; in response to the identification of at least the second security processor, upon request from the identification device, the network head-end transmits (134) a command to re-establish the first security processor, and, subsequently, in response, the first security processor switches (134) from the idle state to the active state.

16 Claims, 2 Drawing Sheets (51) Int. Cl.
*H04N 21/266* (2011.01)
*H04N 21/254* (2011.01)
*H04L 29/08* (2006.01)

(52) U.S. Cl.
CPC ............... *H04N 21/26606* (2013.01); *G06F 2221/0742* (2013.01); *H04L 67/10* (2013.01)

(58) Field of Classification Search
USPC ........................................ 713/150, 163, 164
See application file for complete search history.

(56) References Cited

U.S. PATENT DOCUMENTS

2012/0290831 A1\* 11/2012 Magis .................... H04L 9/083
713/150
2013/0031576 A1 1/2013 Koemmerling
2013/0046969 A1\* 2/2013 Dubroeucq .......... H04N 21/631
713/150

\* cited by examiner

METHOD FOR THE IDENTIFICATION OF SECURITY PROCESSORS

CROSS REFERENCE TO RELATED APPLICATION

This application is the national phase under 35 USC 371 of international application no. PCT/FR2016/053065, filed Nov. 24, 2016, which claims the benefit of the Nov. 27, 2015 priority date of French application no. 1561518.

FIELD OF INVENTION

The invention relates to distribution of multimedia content, and in particular, to protection of such content.

BACKGROUND

In a system for providing protected multimedia-content, a network head-end handles the protection of the multimedia content and its transmission to a set of terminals. A terminal furnished with a security processor is used by a client of the system to access content.

Accessing protected multimedia-content means loading it into memory and removing protection therefrom, on the fly, as it is received, or from a recording medium on which it has previously been recorded, with a view to playing it, recording it, or making any other use thereof offered by the system.

The content provided includes audiovisual content, for example television programs, audio content only, for example a radio program, or more generally any digital content containing video and/or audio such as a computing application, a game, a slideshow, an image or any data set.

Among these types of content, temporal content will be considered more particularly hereinafter. Temporal multimedia content is a multimedia content, the playing of which is a succession, over time, of sounds, in the case of audio temporal content, or of images, in the case of video temporal content, or of sounds and of images temporally synchronized with one another in the case of audiovisual temporal multimedia content. Temporal multimedia content can also comprise interactive temporal components synchronized with the sounds or the images.

In order to be provided, such content is coded or compressed in such a way that its transmission requires less bandwidth. For this purpose, the video component of the content is coded according to a video format, such as MPEG-2.

Such a coding scheme calls upon general methods of data compression. For still images, it utilizes in particular the spatial redundancy internal to an image, the correlation between the neighboring points and the lesser sensitivity of the eye to details. For moving images, it utilizes the high temporal redundancy between successive images. The utilization of said temporal redundancy makes it possible to code certain images of the content, here termed deduced images, with reference to others, here termed source images, for example by prediction or interpolation, so that their decoding is possible only after that of said source images. Other images, here termed initial images, are coded without reference to such source images, that is to say that they each contain, when they are coded, all of the information required for their decoding and therefore that they can be completely decoded independently of the other images. The initial images are thus the obligatory entry point when accessing the content. The resulting coded content does not therefore comprise the data required for decoding each of the images independently of the others, but consists of "sequences" according to the MPEG-2 terminology. A sequence carries out the compression of at least one "group of images" (or GOP, for Group Of Pictures, in MPEG-2). A group of images is a series of consecutive images wherein each image is, either initial and source for at least one deduced image contained in the same series of consecutive images, or deduced and such that each of the source images required for its decoding belongs to the same series of consecutive images, and not containing any smaller series of consecutive images and possessing these same properties. The group of images is thus the smallest content part that can be accessed without having to decode another part of this content beforehand. A sequence is delimited by a "header" and an "end," each identified by a first specific code. The header comprises parameters that characterize expected properties of the decoded images, such in particular as horizontal and vertical sizes, ratio, and frequency. The standard recommends that the header be repeated between the groups of images of the sequence, in such a way that its successive occurrences are spaced about a few seconds apart in the coded content.

For example, a group of images more commonly comprises from 10 to 12 images, representing a duration of play of between 0.4 and 0.5 seconds in a system with 25 images per second.

Temporal multimedia content can comprise several video components. In this case, each of these components is coded as described hereinabove.

The audio component of the content is moreover coded according to an audio format such as MPEG-2 Audio.

Such a scheme for compressing an audio temporal content obeys the same principles hereinabove described for that of a video temporal content. The resulting coded content is therefore, in an analogous manner, made up of "frames." A frame is the analog, in audio, of a group of images in video. The frame is therefore in particular the smallest audio content part that can be accessed without having to decode another part of this audio content. The frame furthermore contains all of the information useful for its decoding.

For example, a frame comprises 384 or 1152 samples each coding a sound, representing, according to the sampling frequency of the signal, a duration of play of 8 to 12, or 24 to 36 milliseconds, i.e. typically a few tens of milliseconds.

Temporal multimedia content can comprise several audio components. In this case, each of these components is coded as described hereinabove.

The coded components of the multimedia content, also referred to as elementary data trains, are thereafter multiplexed, that is to say, in particular, synchronized, and then combined into a single data train, also termed a multimedia stream, or stream.

Such content, in particular when it is the subject of rights such as copyrights or similar rights, is provided protected by a multimedia content protection system that makes it possible to ensure compliance with the content access conditions that ensue from these rights.

It is therefore typically provided split into several successive segments of content that are temporally ordered with respect to one another and individually protected by the content protection system.

By "segment" is meant a restricted part of the plaintext multimedia stream, the playing of which has a shorter duration than that of the playing of the multimedia stream in full. A segment therefore comprises a restricted part of each video or audio component of the plaintext multimedia stream, the playing of which has one and the same shorter duration than that of the playing of the multimedia stream in full. These restricted parts of components are synchronized in the stream so as to be played simultaneously. A segment therefore comprises the restricted part of the temporal series of video sequences or of groups of images, or of audio frames carrying out the coding of this restricted component part of the plaintext multimedia stream. This restricted part consists of a plurality of video sequences or of groups of images, or of successive audio frames. Successive is understood here as following one another immediately, that is to say without being separated, in the temporal progress of the content, by other video sequences or groups of images, or audio frames. Typically, a segment comprises more than ten, a hundred, a thousand or ten thousand, successive groups of video images of one and the same coded video component of the stream, or more than ten to a hundred times more successive audio frames of one and the same coded audio component of the stream.

Each segment is typically encrypted in regard to its protection. This encryption is generally carried out by means of a specific encryption key, by a symmetric algorithm. It is applied to the segment considered of the stream resulting from the multiplexing or, before multiplexing, with the restricted parts of the components of the coded content, which make up this segment. The key is termed specific since it is used solely to encrypt this segment among the whole set of segments of the multimedia content.

A segment is therefore not characterized by its structure, but by the key used to encrypt it. A segment is therefore the plurality of immediately successive video sequences and of audio frames encrypted with one and the same key.

Accessing a temporal multimedia content protected in this way signifies here more precisely, successively accessing, on the fly as they are received, successive segments, that is to say: loading the successive segments of the multimedia content into memory, removing the protection therefrom, decoding them, and then transmitting them to a multimedia apparatus able to play them, record them, or make any other use thereof offered by the service for providing protected multimedia-content. Access to the protected temporal multimedia content will be described hereinafter only with a view to the playing thereof. It is identical in the case of any other use offered by the service for providing protected multimedia-content.

By "plaintext" is meant the fact that the multimedia stream or the segment no longer needs to be descrambled to be played, by a multimedia apparatus, in a manner that is directly perceptible and intelligible to a human being.

By "multimedia apparatus" is meant furthermore any device able to play the plaintext multimedia stream, such as a television or a multimedia reader.

Finally, by "on the fly" is meant the fact that the segments of the multimedia content are processed as and when they are received, without waiting for the complete multimedia content, that is to say all of its segments, to be fully received.

In order to remove the protection of an encrypted segment of a protected multimedia-content, with a view to accessing this content, a terminal must decrypt this encrypted segment. To this end, it must obtain the key required for this decryption.

To allow same, the network head-end transmits the encrypted segment of protected multimedia-content, synchronized with an access control message comprising a cryptogram of the key required for the decryption of the encrypted segment. This cryptogram is typically obtained by encrypting, with a symmetric algorithm, the specific key required for the decryption of the encrypted segment.

In such a system, a terminal receives, synchronized with an encrypted segment of multimedia content, the access control message comprising the cryptogram of the decryption key required for the decryption of this segment. The key required for decryption of the cryptogram, termed the operating key, will have previously been provided to terminals that have acquired a right to play the protected multimedia-content.

The content-protection system used is typically a Conditional Access System, or CAS. The terminology in the field of conditional-access systems is thus used hereinafter in this document.

A multimedia content segment thus has a predetermined duration of play, termed the "cryptoperiod" of the system. Loosely speaking, the segment itself is sometimes referred to as a "cryptoperiod." The specific key for encrypting a multimedia content segment is termed the "control word," or "CW." The key required for the decryption of the encrypted segment is equal to the control word with the aid of which the segment was encrypted. In this context, encryption and decryption of multimedia content segment are also referred to as scrambling and descrambling, respectively. The access control message comprising a cryptogram of a control word is finally a control message in respect of the access entitlements, or ECM, for Entitlement Control Message. The ECM can also comprise a confidential section of predetermined length reserved for the transmission of encrypted data.

To access the content with a view to playing it, the terminal processes the ECM received synchronized with a scrambled multimedia content segment. It transmits it firstly to a security processor with which it has been furnished. This security processor is dedicated to the implementation of security functions such as the secure storage of the keys, and the utilization of the access control messages, and in particular of the ECM. This security processor is typically a hardware component, such as a dedicated microprocessor or a chip card, also simply termed "card," hereinafter, respectively integrated or associated via a card reader, with the terminal, or a software module of the terminal.

If, subsequent to the legitimate acquisition, by the client of the system, of the right to play the content, the security processor has duly received the operating key from the network head-end, the security processor decrypts the cryptogram of the control word using the operating key, and then returns the control word to the terminal. The descrambler of the terminal can therefore descramble the scrambled multimedia content segment to obtain it as plaintext. This allows access to the multimedia content segment, its transmission to the multimedia apparatus, and it playing by this apparatus.

In the converse case, either the security processor returns the diagnosis thereof to the terminal, which inhibits the utilization of the ECM, and does not decrypt in particular the cryptogram of the control word that it comprises, or else the security processor returns an erroneous value of the control word to the terminal, and the descrambling of the scrambled multimedia content segment is also erroneous. This prohibits access to the multimedia content segment, and the playing thereof as plaintext by the multimedia apparatus.

The legitimate acquisition, by the client of the system, of the right to play the content generally consists of subscription or session purchase that make it possible to remunerate the service for providing the protected multimedia-content as well as the beneficiaries of this content.

Services, termed pirate services, are known. These are aimed at offering access to protected multimedia-content at lower tariffs, in particular with disregard for the rights of the beneficiaries. For example, card-sharing pirate services, are known.

A card-sharing service is rendered by a card-sharing system typically comprising a card-sharing server linked by a bidirectional communication network, termed a card-sharing network, to at least one "sharing terminal" that has been furnished with a card. This sharing terminal has legitimately acquired the right to play a protected multimedia-content and received in response the operating key required to decrypt the cryptogram of the control word, in order to access this content.

The card-sharing system offers a requesting terminal, which has not legitimately acquired the right to play this content, nor received in response the operating key required to decrypt the cryptogram of a control word in order to access this content, the ability to access this content illegitimately.

To benefit from this illegitimate access, the requesting terminal must connect to the system for providing protected multimedia-content and to the card-sharing server. From the former, it receives a segment of the content, synchronized with an ECM comprising a cryptogram of a control word required in order to access this segment. To the latter, it transmits the ECM received. The card-sharing server then searches for an available sharing terminal, and transmits the ECM to it. The search for an available sharing terminal rests upon the implementation of a sharing protocol, which makes it possible to manage access and the priorities of access to the sharing terminals and shared cards in the card-sharing network as a function of the state of the network and of its loading. A sharing terminal is here termed "available" if it is itself available and if it is furnished with a likewise available card. The available sharing terminal then transmits the ECM to its available card, also termed a "shared card," which then decrypts the cryptogram of the control word. Next, the shared card returns the decrypted control word to the available sharing terminal, which returns it to the card-sharing server, which in turn returns it to the requesting terminal. The requesting terminal is thus able to descramble the segment so as to obtain it as plaintext, and therefore to access it. It can then transmit it to a multimedia apparatus that plays it.

Diverse actions may be undertaken to combat pirate services of this type. For example, actions of deterrent communication consisting in indicating to their stakeholders the illegality of their activities and the risks that they incur by implementing them, as well as in requesting that they put an end thereto. Also possible are the implementation of technical countermeasures aimed at disrupting the operation of the service or judicial actions aimed at obtaining the conviction of stakeholders by courts. In all cases, in order to prepare such actions, it is important to be able to identify the shared cards that are associated with the sharing terminals or their owners.

SUMMARY

In order to identify shared cards of the card-sharing system, an identification device computes an ECM, termed an identification ECM, comprising a cryptogram of a control word and an identification command. Next, the identification device transmits the identification ECM to the card-sharing server.

The card-sharing server then searches for an available sharing terminal and then transmits the identification ECM to it. Once found, the available sharing terminal transmits the identification ECM to its available card, also termed the "shared card."

The shared card then decrypts the control word cryptogram with the operating key currently in use by the system for providing protected multimedia-content. Next, the available card also computes, in response to the identification command and as a function of an identifier recorded in its memory, an identification datum that makes it possible to compute this identifier. The shared card thereafter returns the identification datum to the sharing terminal, which in turn returns it to the sharing server, which returns it finally to the identification device.

The identification device then determines, as a function of the identification datum, the identifier of the shared card, and then stores it.

Methods along the lines of the foregoing fail to identify all shared cards implemented in the card-sharing network. The identification device, which accesses the card-sharing system like any client terminal, does not in fact generally have access to the whole set of these cards. On the contrary, its identification ECMs are even generally oriented in a recurrent manner, by the sharing protocol implemented by the sharing server, toward one or the other of one and the same restricted set of shared cards. It is therefore desirable to increase the number of shared cards identified in a card-sharing network, doing so while remaining as discreet as possible.

In one aspect, the invention features a method that includes the momentary suspension of the first security processor after it has been identified. This makes it possible to identify the second security processor with higher probability and more rapidly than if the first security processor had remained active. Such a method therefore tends to make it possible to maximize the number of shared security processors identified in a sharing network.

Moreover, since the first security processor is again switched to its active state after the second security processor has been identified, it is more difficult for the sharing server to detect the implementation of this method. In fact, it is difficult, or indeed impossible, to distinguish an accidental stoppage of the operation of the first security processor from an intentional stoppage caused by the claimed method.

The restarting of the security processor also assists in concealing the operation of the method. If the first security processor were not switched again to its active state, then the number of shared security processors that would stop operating would increase continuously during the implementation of the identification method. Such a continuous increase in the number of shared security processors that stop operating is a clear signature that distinguishes the random accidental stoppage of a few security processors. Thus, it would be possible for the sharing server to detect the implementation of the identification method early enough to prevent the identification of the other shared security processors.

These embodiments of this method furthermore exhibit the following advantages:
1. The identification, successively, of each of the security processors of a first group, and then the suspension of this first group of security processors, makes it possible to increase the number of security processors identified, before suspending them;
2. The recording of an identifier of the first group in the memory of each of the security processors of this first group makes it possible to suspend or restore each of the security processors of this first group by means of one and the same suspension or restoration command;

3. The transmission of a command, by the network head-end, by means of an access control message comprising a cryptogram of a control word, makes it very difficult for pirate terminals to filter these commands. Indeed, the security processors used in these pirate terminals need to process them in order to offer access to the content.

4. The implementation of interruption only when a condition is satisfied by a number of security processors of the first group of security processors makes it possible to automate and to optimize the formation of this first group as a function of the evolution of the temporal process for identifying security processors.

5. The interruption only when a condition is satisfied by a number of security processors newly identified since the last implementation for the first security processor, makes it possible to automate and to optimize the determination of the moment of restoration of the first security processor as a function of the evolution of the temporal process for identifying security processors.

6. The computation, by the network head-end, of the second access control message or of the control word cryptogram that it comprises, makes it possible to decrease the computational load of the identification device as well as its cost.

The only methods and systems are described herein are non-abstract methods and systems. Descriptions of abstract methods and systems have been excluded. As such, the claims cover only non-abstract methods and systems. All abstract methods and systems that the claims may be deemed to cover are hereby expressly disclaimed.

All methods described and claimed herein have real-world results. Descriptions of methods that produce non-real world results have been omitted. All systems described and claimed herein are real-world systems made of matter that, during operation, consume energy and generate waste heat.

The systems and methods described herein all implement an improvement in a technology. The technology that is improved is the technology of theft prevention, and in particular, detecting theft of intellectual property and of apprehending the perpetrators of such theft.

The description that follows is given in the particular case where the security processor is a chip card. However, everything described in this particular case applies to the other possible forms of implementation of a security processor. In particular, this applies to the case where the security processor is implemented in each terminal in the form of an irremovable electronic component or in the form of a software module executed by a microprocessor of the terminal.

BRIEF DESCRIPTION OF THE DRAWINGS

The invention will be better understood on reading the description that follows, given solely by way of nonlimiting example and with reference to the drawings in which.

In these figures, the same references are used to designate the same elements.

DETAILED DESCRIPTION

Figure 1:
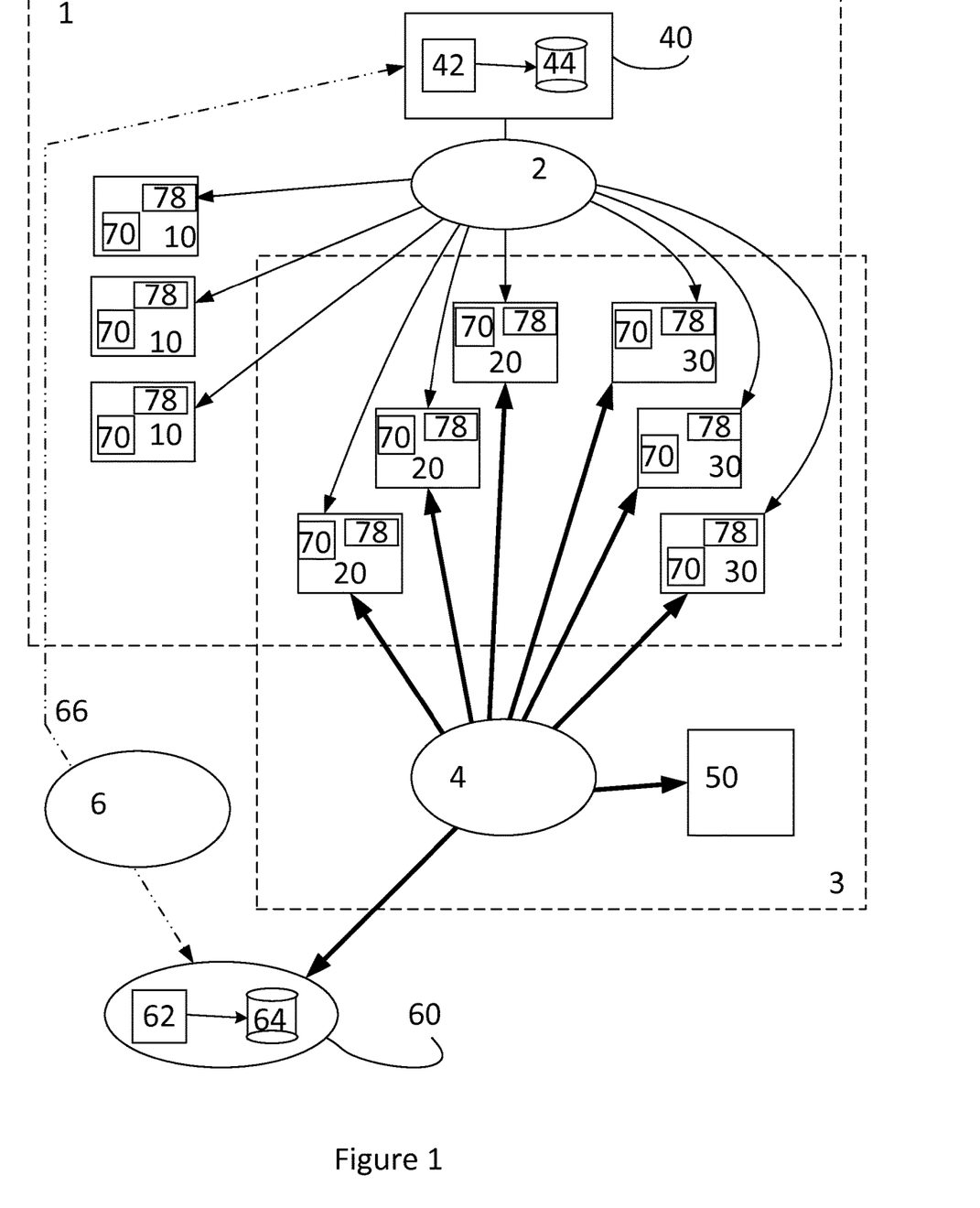
FIG. 1 is a schematic representation of the architecture of a system for identifying shared cards according to the invention.

FIG. 1 represents a system for identifying cards. This system comprises a system 1 for providing protected multimedia-content, a card-sharing system 3, and a device 60 for identifying cards.

The system 1 comprises a plurality, typically thousands, tens or hundreds of thousands of terminals, and at most a few million terminals 10, 20, 30 that are mechanically independent of one another and linked, by way of a network 2, to a network head-end 40.

The network 2 for providing protected multimedia-content is a long-distance network for distributing information making it possible to establish a point-to-multipoint communication link between the head-end 40 and the terminals 10, 20, 30. For example, the network 2 is a satellite-based or cable-based broadcasting network, or the worldwide web better known by the term "Internet network."

The head-end 40 is able to protect multimedia content, and to transmit it, over the network 2, to the terminals 10, 20, 30. For this purpose the head-end 40 comprises a programmable microprocessor 42 and a memory 44. The microprocessor 42 is able to execute instructions recorded in the memory 44. Typically, this is a microprocessor such as a general-purpose microprocessor from the company Intel, or from the company ARM. More generally, it is for example any microprocessor able to implement a Linux or Windows operating system. The memory 44 comprises instructions required for the execution of the method of FIG. 3.

A terminal is able to access protected multimedia-content transmitted over the network 2, by the head-end 40, with a view to playing it. For this purpose, at least the terminals 10, 30 comprise a chip card 70. Each card 70 is able to store the operating key, as well as to process the ECMs and in particular to decrypt the cryptograms of control words. An exemplary embodiment of the card 70 is described in greater detail with reference to FIG. 2.

The terminals 10, 20 each comprise a descrambler 78. Such a descrambler 78 is an electronic circuit able to, or programmed to, descramble the multimedia content with the control word received.

Hereinafter, from among the whole set of terminals of the system 1, three distinct groups of terminals are distinguished, namely: a first group comprising the terminals used legally and called "authorized terminals;" a second group comprising the terminals called "requesting terminals;" and a third group comprising the terminals called "sharing terminals."

The terminals of the first, second and third groups each bear the numerical references, respectively, 10, 20 and 30.

Each terminal 10 legitimately acquires the right to play the protected multimedia-content and receives in response the operating key required to access it. The operating key is contained in the card 70 of this terminal 10. The terminals 10 are typically the most numerous in the system 1.

The terminals 20 are generally identical to the authorized terminals 10. A terminal 20 does not acquire the right to play the protected multimedia-content. It does not therefore need to be able to store the operating key, or to process the ECMs, and can therefore be devoid of any card. The terminals 20 are each equipped with a card 70 devoid of the operating key required to access the multimedia content. A terminal 20 is on the other hand able to use a control word to descramble the multimedia content with a view to playing it. On the other hand, in contradistinction to the terminals 10, to offset the absence of the required operating key, the terminals 20 form part of the card-sharing system 3 so as to be able to illegally access the protected multimedia-content.

The terminals 30 form part of the system 1 for providing protected multimedia-content, and of the card-sharing system 3. A terminal 30 is in principle identical to a terminal 10. In the same way as a terminal 10, it legitimately acquires the right to play the protected multimedia-content and receives in response the operating key required to access it. The operating key is contained in the card 70 of this terminal 30. The card-sharing system does not, however, require that this terminal 30 itself actually access the content with a view to playing it. It can therefore be devoid of any descrambler able to descramble the multimedia content.

The card-sharing system 3 comprises the terminals 20, 30 and at least one card-sharing server 50 linked, by way of a network 4, to each of the terminals 20, 30. To simplify FIG. 1, only one server 50, and only terminals 20, 30 directly linked to this server, are represented therein. These terminals 30 are generally at least ten times less numerous than the terminals 20, and less than a hundred thousand. They may be several tens, hundreds or, typically, several thousands or tens of thousands.

The network 4, termed the card-sharing network, is a long-distance network for distributing information making it possible to establish a point-to-point communication link between the server 50 and each of the terminals 20, 30. For example, the network 4 is the worldwide web better known by the term "Internet network."

The device 60 is linked, on the one hand to the head-end 40 by a point-to-point link 66 established in a network 6, and on the other hand to the server 50 by a point-to-point link established in the sharing network 4. The network 6, termed the identification network, is any communication network, local or long-distance, private or public, making it possible to establish such a link. The device 60 comprises a programmable microprocessor 62 and a memory 64. The microprocessor 62 is able to execute instructions recorded in the memory 64. The memory 64 comprises instructions required for the execution of the method of FIG. 3.

Figures 2, 3:
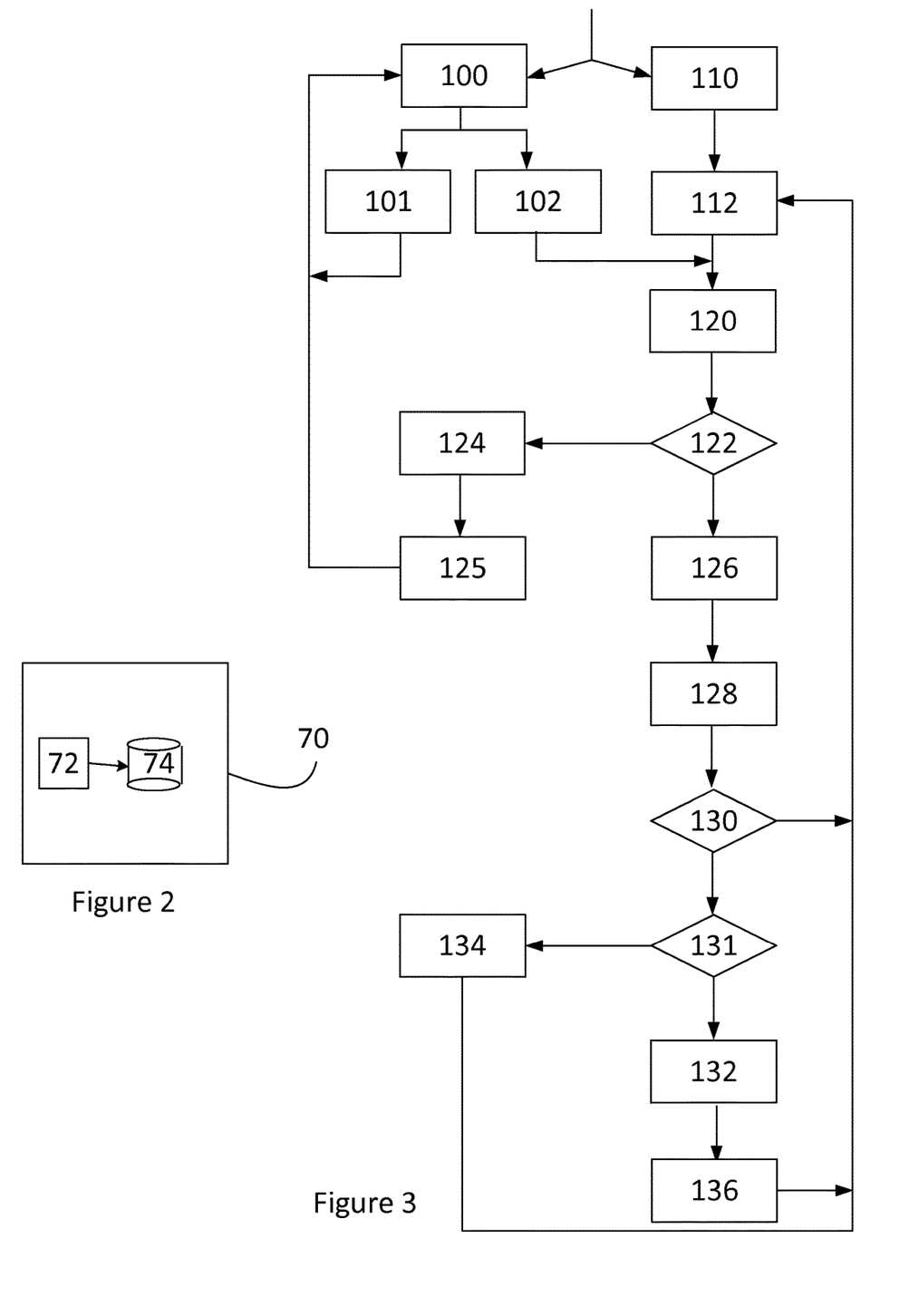
FIG. 2 is a schematic representation of a security processor used in the system of FIG. 1.
FIG. 3 is a schematic representation of a method for identifying shared cards according to the invention.

FIG. 2 represents, in greater detail, the card 70. The latter is able to be inserted into the terminal and, alternately, removed from this terminal by a user. It comprises a programmable electronic microprocessor 72 and a memory 74. The microprocessor 72 is able to execute instructions recorded in the memory 74. The memory 74 comprises instructions required for the execution of the method of FIG. 3. In certain cases, the memory 74 can also contain the operating key legitimately or illegitimately acquired by the terminal. The memory 74 also comprises an identifier of the card 70 that makes it possible to distinguish it from all the other cards 70 used in the system 1.

For the card 70 and the head-end 40, only the differences with respect to a conventional chip card and to a conventional network head-end are described in detail.

The operation of the system of FIG. 1 will now be described with reference to the method of FIG. 2.

The method starts with a step 100 during which the head-end 40 transmits on a point-to-multipoint link established with the terminals 10, 20, 30 in the network 2, protected multimedia-content, synchronized with an ECM, denoted hereinafter ECM1. For example, the protected multimedia-content is multiplexed with the message ECM1. The message ECM1 comprises a cryptogram of a control word required by any terminal to access a segment of the multimedia content.

Subsequent to this transmission, the terminals 10, 20, 30 receive the segment of protected multimedia-content, synchronized with the message ECM1.

Thereafter, during a step 101, each authorized terminal 10 processes the message ECM1 so as to access the segment of the protected multimedia-content. For this purpose, this terminal 10 demultiplexes the protected multimedia-content and the message ECM1 and then transmits the message ECM1 to the card 70 that is inserted into this terminal. The card 70 extracts the cryptogram of the control word from the message ECM1 and decrypts this cryptogram with the operating key stored in the memory 74 to obtain the decrypted control word. Thereafter, the card 70 transmits the control word, thus decrypted, to the descrambler 78 of this terminal 10. Next, the descrambler 78 of the terminal 10 descrambles the segment of the protected multimedia-content with the decrypted control word received. This descrambled segment is thereafter played by a multimedia reader hooked up to the terminal 10. This step 101 is repeated for each scrambled segment of the multimedia content transmitted by the head-end 40 over the network 2.

In parallel, during a step 102, each requesting terminal 20 demultiplexes the protected multimedia-content and the message ECM1. However, in contradistinction to the terminal 10, the terminal 20 does not use its card 70 to decrypt the cryptogram of the control word contained in the message ECM1 to access the segment of the protected multimedia-content.

On the contrary, during step 102, the requesting terminal 20 transmits the message ECM1 to the server 50 on a point-to-point link established in the sharing network 4.

During a step 120, the server 50 implements, in response to the receipt of the message ECM1, a sharing protocol to search for an available sharing terminal 30. The sharing terminal 30 thus found is furnished with at least one available card 70, also termed a "shared card." The server 50 transmits the message ECM1 to the sharing terminal 30 found. The sharing terminal 30 found itself transmits the message ECM1 to its shared card 70. The shared card 70 decrypts the cryptogram of the control word contained in the message ECM1 to obtain the decrypted control word.

Next, during a step 122, the shared card 70 determines whether the message ECM1 comprises an identification command.

The message ECM1 does not comprise an identification command. Consequently, on completion of step 122, the method continues via a step 124. During step 124, the shared card 70 returns the decrypted control word to the sharing terminal 30, which returns it to the server 50, which in turn returns it to the requesting terminal 20 that transmitted the message ECM1 that contained the cryptogram of this control word.

During step 125, the terminal 20 receives the decrypted control word and transmits it to its descrambler 78. Its descrambler 78 then descrambles the corresponding segment of the protected multimedia-content with this control word decrypted by the terminal 30. Thereafter, the method returns to step 100 and steps 102 to 125 are repeated for the following cryptoperiod of the multimedia content. The requesting terminal 20 can thus access the protected multimedia-content without having acquired the right thereto.

In parallel with steps 100 to 102, steps 110 and 112 are implemented.

During step 110, the identification device 60 is connected to the head-end 40 by the link 66 and to the server 50 by a point-to-point link established in the sharing network 4.

Thereafter, during step 112, the identification device 60 computes an identification ECM, denoted hereinafter ECM2. The message ECM2 is a message of identical structure to that of the ECMs conventionally computed by the head-end 40. The message ECM2 comprises a cryptogram of a control word. The control word whose cryptogram is contained in the message ECM2 is however not used by the head-end 40 to scramble a segment of the protected multimedia-content. For example, this control word and its cryptogram are respectively computed, exactly as by the head-end 40, by drawing a random number and by encrypting this random number with the operating key currently in use by the head-end 40. In contradistinction to an ECM computed by the head-end 40, the message ECM2 furthermore comprises an identification command. The insertion of the identification command does not distinguish the structure of the message ECM2 from the structure of an ECM computed by the head-end 40. For example, it consists of the setting of a predetermined flag in a confidential section of the message. The structure of this message ECM2 therefore cannot be distinguished from that of an ECM computed by the head-end 40 like the message ECM1. Hence, it cannot be filtered by the terminals 20, 30 or by the server 50 so as to prevent its processing by a shared chip card of one of the terminals 30.

Connected to the sharing network 4 like a requesting terminal 20, the device 60 thereafter transmits the message ECM2 to the server 50. The server 50 then processes the message ECM2 in a manner that is identical to that described for the message ECM1. In particular, it implements steps 120 and 122.

However, during step 122, the shared card 70 detects the presence of the identification command in the message ECM2 and so then undertakes a step 126 instead of undertaking step 124.

During step 126, the shared card 70 computes, as a function of its identifier recorded in its memory 74, an identification datum that makes it possible to determine this identifier. For example, the shared card 70 combines its identifier with the decrypted control word that it obtained during step 120. The structure of the identification datum is identical to the structure of a decrypted control word. Accordingly, by way of illustration, this combination is an operation of encryption of the identifier with the decrypted control word obtained. More particularly, this encryption operation is a logical disjunction operation, also termed "exclusive OR" or XOR. Thus, in this embodiment, the identification datum is obtained by carrying out an "exclusive or" between the identifier of the shared card 70 and the decrypted control word.

Next, the shared card 70 returns the identification datum to the sharing terminal 30 in an identical manner to what was described, with reference to step 124 for a decrypted control word. Since the structure of the identification datum is identical to that of a decrypted control word, the terminal 30 and the server 50 are incapable of distinguishing between the two. Hence, they process the identification datum in the same manner as a decrypted control word. Thus, the terminal 30 returns it to the server 50, which in turn returns it to the device 60.

Thereafter, during a step 128, the device 60 computes, as a function of the identification datum, the identifier of the shared card 70, and then stores it in the memory 64. For this purpose, it firstly obtains the decrypted control word by decrypting the cryptogram inserted into the message ECM2 during step 112 by the operating key currently in use by the system 1. Next, the device 60 combines the identification datum with the control word thus decrypted so as to obtain the identifier of the shared card 70. In the implementation described herein, this combination is an operation of decryption of the identification datum with the decrypted control word. More particularly, the device 60 carries out an "exclusive or" between the identification datum returned by the server 50 and the decrypted control word. This enables it to obtain the identifier of the shared card 70. Step 128 thus terminates the method for identifying the shared card 70.

Steps 112 to 128 are thereafter repeated so as to identify other shared cards in the card-sharing system 3. Indeed, if several sharing terminals 30 are available in the system 3, each of these terminals 30 might be found by the server 50 during step 120. Thus, after the identification of a first shared card, during a subsequent implementation of step 120, a second shared card may be identified. The repetition of steps 112 to 128 therefore makes it possible to successively identify several shared cards in the card-sharing system 3.

Moreover, in a nearly stable state of the sharing system 3 and of the loading of the network 4, the available sharing terminals 30 found during step 120 are almost always the same. Consequently, in this nearly stable state, the shared cards 70 used during steps 120, 122, 124, and 126 remain nearly the same, and are assigned in a recurrent manner to the processing of the ECMs transmitted by the terminals 20 and the device 60. In this nearly stable state, the identification ECMs therefore tend to be transmitted in a recurrent manner to a limited group of sharing terminals 30 and therefore to a limited number of shared cards 70. Thus, if on completion of step 128, the method returns systematically directly to step 112, only a restricted group of shared cards 70 is identified.

More precisely, at the start of these iterations of steps 112 to 128, the number of new shared cards 70 identified increases rapidly and the identification method is therefore efficient. Next, in tandem with the repetitions of steps 112 to 128, the message ECM2 is more and more frequently directed by the server 50 to a shared card 70 that has already been identified. Thus, as time elapses, the number of new shared-cards 70 identified per unit time T decreases. Stated otherwise, if nothing is done, the efficiency of the identification method decreases over time. This decrease in the efficiency of the identification method is manifested by an increase in the time and effort (typically the number of identification ECM to be submitted to the server 50) that are required for the identification of new shared-cards 70.

To remedy this drawback, in the method described here, step 128 is followed by a step 130. During step 130, the device 60 determines whether the identification method is, or is not, still efficient. For this purpose, the device 60 constructs an efficiency indicator for the identification method. When the value of this indicator satisfies one or more predetermined conditions that characterize a decline in the efficiency of the identification method, the device 60 undertakes a step 131. In the converse case, the efficiency of the identification method is considered to still be satisfactory, and the device 60 therefore continues the method without acting on the state of the sharing system 3, by directly undertaking a new implementation of step 112 and therefore of steps 112 to 130.

In some practices, the efficiency indicator is the number NsC of shared cards 70 newly identified in the course of a period Ts that is a sliding window of predetermined duration that terminates at the current instant. The condition that triggers the execution of step 131 is here the following condition (1): NsC≤SNsC, where SNsC is a predetermined threshold.

If the condition (1) is not satisfied, the device 60 therefore triggers directly a new implementation of step 112 without passing through step 131.

If the condition (1) is satisfied, the device 60 undertakes an implementation of step 131.

During step 131, the device 60 tests the value of a marker of the state of the identification method. This marker is recorded in its memory 64. According to the value of this marker, the device 60 undertakes a step 132 and, alternately, a step 134. During these steps 132, 134, the device 60 acts on the state of the sharing system 3 so as to cause a hike in the efficiency of the identification method. In the embodiment described herein, the marker takes the value "true" if a group of previously identified shared cards is suspended. In the converse case, the marker takes the value "false." If the value of the marker is equal to "false," the device 60 executes step 132. In the converse case, it executes step 134.

During step 132, the device 60 creates a group Gi containing the identifiers of the newly identified shared cards 70. The newly identified shared cards are those that were identified during the successive iterations of steps 112 to 128 since the last implementation of step 134, or since the activation of the method if step 134 has not already been implemented. Thereafter, upon request from the device 60, the head-end 40 transmits a group-construction command to each of the cards 70 whose identifier belongs to the group Gi. This command comprises an identifier of the group Gi. This identifier of the group Gi makes it possible to distinguish the group Gi constructed during this execution of step 132 of possible groups constructed during previous executions of this step 132. In response, each of the cards 70 belonging to the group Gi, stores this identifier of the group Gi in its memory 74.

The group-construction command is transmitted to the terminals 30 by way of the network 2. Preferably, the group-construction command is transmitted in an ECM message. Typically, the group-construction command is inserted into a confidential section of predetermined length of the ECM. Thus, the presence of this command cannot be detected by the terminals 20, 30 or the server 50 in particular by analyzing the structure of the ECM message. These ECM messages therefore cannot be filtered and then ignored by the sharing system 3. The ECM message then also comprises the identifier of the card 70 that must record the identifier Gi in its memory 74. Because the ECMs are the only messages that cannot be filtered, after all, the sharing terminals 30 need to process them to offer access to the content, they make particularly useful vessels for ensuring transmission of the group-construction command.

Each shared card 70 of a terminal 30 that receives an ECM verifies whether this ECM comprises a card identifier that corresponds to the card identifier that has been recorded in its memory 74. If this is not the case, the card 70 executes steps 120 and 122 as described previously. If, on the contrary, the card 70 detects that the ECM message received comprises a card identifier that corresponds to the card identifier recorded in its memory 74, then, in addition to executing steps 120 and 122, the card records, in its memory 74, the identifier of the group Gi that is contained in this ECM.

As a function of the cryptoperiod of the system 1, of the length of the confidential section of an ECM and of the number of newly identified cards 70, several group-construction commands, therefore several ECMs, and therefore several cryptoperiods, may be required for the construction of the group.

Once the identifier Gi has been recorded in the memory 74 of each of the cards 70 whose identifier belongs to the group Gi constructed, during a step 136, upon request from the device 60, at an instant t1, the head-end 40 transmits, a suspension command to each of the cards 70. This group command comprises the identifier Gi. Moreover, this command is devoid of individual identifiers of shared cards 70. It is transmitted by the head-end 40, over the network 2, to the whole set of cards 70.

In a preferred practice, the group-suspension command is inserted into a confidential section of an ECM, as was described above for the group-construction command.

Each shared card 70 of a terminal 30 that receives an ECM determines whether this ECM comprises a group identifier that corresponds to the group identifier recorded in its memory 74. Thus, here, a single ECM suffices in all cases to address oneself to the whole set of cards 70 that belong to the same group Gi. If the memory 74 of the card 70 does not comprise the identifier of the group Gi, then it executes steps 120 and 122 as described previously. If the memory 74 of the card 70 comprises the identifier of the group Gi, then, it switches: from an active state, in which, in response to the receipt of an ECM, it decrypts the cryptogram of the control word contained in the ECM to obtain the decrypted control word, and then returns the decrypted control word to the sharing terminal 30, to an inactive state, in which the shared card 70 is made unavailable and does not return to the sharing terminal 30 any response to the receipt of an ECM devoid of a restoration command.

Stated otherwise, in response to the receipt of the suspension command, the cards 70 that belong to the group Gi, inhibit their contributions in step 120 and the execution of step 122.

Finally, during step 136, the device 60 reinitializes the efficiency indicator for the identification method and assigns the value "true" to the state marker to indicate that the group Gi of cards is currently suspended. After step 136, the device 60 triggers a new implementation of step 112, and, beyond a new iteration series of steps 112 to 128.

The suspension of the card, thus rendering it unavailable, makes it possible to prevent the same card from being used to process the following identification ECMs and therefore from being identified again. Hence, from the instant t1, other cards 70 not belonging to the suspended group Gi are used by the system 3 to process the ECMs. Thus, from this instant t1, the following iterations of steps 112 to 128 give rise to the identification of these other cards by the device 60, with higher probability and more rapidly than if the suspended group had not been suspended. The suspension causes a local increase in the efficiency of the identification method and makes it possible to maximize the number of shared cards identified by the method.

During step 134, upon request from the device 60, the head-end 40 transmits, to the shared card 70, a restoration command. In response, the shared card 70 switches from the inactive state to the active state.

During step 134, at an instant t2 that follows the instant t1, upon request from the device 60, the head-end 40 transmits a restoration command to each of the shared cards 70 of the group Gi. This command comprises the identifier of the group Gi. However, it omits any individual identifier for each of the cards 70 of the group Gi. The command is transmitted by the head-end 40 over the provision network 2, to the whole set of cards 70.

In a preferred embodiment, the group-restoration command is transmitted in a confidential section of an ECM, as was described above for the group suspension command. As was the case for the suspension command, a single ECM suffices in all cases for this transmission.

In response, each shared card 70 having stored the identifier of the group Gi in its memory 74 switches from the inactive state back to the active state.

Finally, during step 134, the device 60 reinitializes the efficiency indicator and assigns the value "false" to the state marker recorded in its memory 64. After step 134, the device 60 triggers a new implementation of step 112, and a new iteration series of steps 112 to 128.

The restoration of the suspended cards makes it more difficult for the server 50 to detect the implementation of the method. Moreover, the restoration of the suspended cards disrupts the operation of the system 3 once again. Thus, after the instant t2, the device 60 can rapidly identify new shared cards 70 that have hitherto not been identified.

Numerous other embodiments of the invention are possible. For example, in some practices, the content protection system used is a Digital Rights Management, or DRM, system.

The specific key for encrypting a multimedia content segment is then termed a "content key." The key required for the decryption of the encrypted segment is equal to the content key with the aid of which the segment was encrypted. The access control message comprising a cryptogram of a content key is a "license."

In another embodiment, the content is provided, by the system, protected by any other type of content-protection system, such for example as a more conventional data protection system that does not carry out access-rights management. The claimed method then applies to providing messages required for forwarding the decryption keys, for example.

In another embodiment, a terminal 30 does not legitimately acquire the right to play the protected multimedia-content. In this case, it can receive the ECMs, and therefore the operating key required to access it, for example from the sharing system 3, via the sharing network 4.

The terminals 30 can be incorporated into the server 50. In this case, the server 50 typically contains several shared chip cards.

The device 60 can also be incorporated inside the head-end 40. In this case, the network 6 and the link 66 can be omitted.

In alternative practices, during step 112, the device 60 transmits, to the head-end 40, a request in response to which the head-end 40 computes the message ECM2, or the control-word cryptogram that it comprises, and then returns it to the device 60.

In other practices, the device 60 receives the cryptograms of the control words transmitted by the head-end 40 in ECMs. In this case, during step 112, the cryptogram of the control word incorporated in the message ECM2 can be a genuine cryptogram of a control word used to scramble the multimedia content broadcast by the head-end 40.

During step 112, the identification datum is not necessarily constructed using the control word. For example, the identification datum that is returned by the shared card 70 is constructed solely as a function of the identifier of this card. In this case, during step 128, the device 60 does not need to use the current control word or the current operating key to decrypt the identification datum in order to obtain the identifier of the shared card.

Other efficiency indicators are possible. For example, the efficiency indicator can be equal to a rate TsC of identification equal to NsC/Ts. The condition tested during step 130 is then for example the following: $TsC<STsC$, where STsC is a predetermined threshold. In another example, the efficiency indicator is the total number N of shared cards 70 identified since the last implementation of step 132 or of step 134. The condition tested during step 130 is then $N \geq SN$, where SN is a predetermined threshold. In another example, the efficiency indicator is the global rate $T \times C = N/T$ where T is the total duration elapsed since the last implementation of step 132 or of step 134. The condition tested during step 130 is then for example the following: $TsC<ST \times C$, where $ST \times C$ is a predetermined threshold. The durations Ts and T can also be replaced respectively by predetermined numbers NsI and NI of iterations of steps 112 to 128 to compute the indicators NsC and TsC.

It is also possible to use several efficiency indicators simultaneously, such as the indicators NsC and TsC for example. In this case, the condition that triggers the execution of step 132 can be a complex condition. Typically, a complex condition is a combination of several sub-conditions inter-linked by an "AND," "OR," "XOR" logical operator.

In another embodiment, the choice of the efficiency indicator for the identification method used during step 131 depends on the value of the state marker. Thus, the condition to suspend shared cards and the condition to restore these shared cards is not necessarily the same.

During step 132, as a variant, the group-construction command is transmitted by means of access Entitlement Management Messages, or EMMs. They can also be transmitted in any other, pre-existing or specific, type of message.

In another embodiment, the construction of the group of newly identified cards 70 is not carried out during step 132, but in tandem with the successive iterations of steps 112 to 128 since the last implementation of step 134 or since the activation of the method if step 134 has not already been implemented. For example, upon request from the device 60, the head-end 40 transmits to a shared card 70, as soon as it has been identified during an iteration of steps 112 to 128, a card group-construction command. This command comprises the group identifier, assigned by the device 60, to said group under construction. In another example, as soon as the number of shared cards newly identified during successive iterations of steps 112 to 128 exceeds a predetermined threshold, upon request from the device 60, the head-end 40 transmits to these shared cards 70, a group-construction command to form a group with these cards. The predetermined threshold is for example chosen equal to the maximum number of identifiers of cards 70 that it is possible to insert into a group-construction command that may be contained in a single ECM. Thus, the group can systematically be constructed by transmitting a single ECM. The command for constructing a group can also be systematically dispatched after a predetermined time interval has elapsed.

In another embodiment, before executing step 136, step 132 can be implemented several times to construct several groups. In this case, a card may optionally belong to several of these constructed groups or, on the contrary, to a single of these constructed groups. Thereafter, during the following execution of step 136, a single or just some of the constructed groups, or all the constructed groups, are suspended. In a similar manner, during step 134, a single or just some of the groups of suspended cards, or all the groups of suspended cards, are restored. In another embodiment, steps 132 and then 136, and step 134, can be implemented in parallel and, for example, at the same time. In this case, at least one group of cards is suspended, and at least one different group of cards is restored during the same simultaneous execution of steps 132, 136 and 134.

In another embodiment, the construction of the group of newly identified cards 70 is omitted. In this case, during step 132, the head-end 40 transmits an individual suspension command to each of the newly identified cards 70. Preferably, this individual suspension command is transmitted to a shared card 70 in a confidential section of an ECM as has already been described above for a group-construction command. In this case, the ECM comprises the identifier of the card and not an identifier of the group of cards to be suspended. Here, on the other hand, an ECM then suffices in all cases for this transmission. This card suspension command can, however, also be transmitted by means of an EMM, or of any other, pre-existing or specific, type of message. In the same manner, during step 134, the head-end 40 transmits an individual card restoration command to each of the newly identified cards 70. Preferably, the individual card restoration command is transmitted to a shared card 70 in a confidential section of an ECM. For example, the individual restoration command is identical to the restoration command previously described except that the ECM comprises an identifier of the card in place of the group identifier. Hence a single ECM suffices in all cases for this transmission. This card suspension command can, however, also be transmitted by means of an EMM, or of any other, pre-existing or specific, type of message.

During step 134 or 136, as a variant, the group suspension or restoration command is transmitted by means of EMM, or of any other, pre-existing or specific, type of message.

Having described the invention, and a preferred embodiment thereof, what is claimed as new and secured by Letters Patent is:

1. A method for identifying security processors in a system for providing protected multimedia-content, said method comprising executing a first step, executing a second step, executing a third step, executing a fourth step, executing a fifth step, executing a sixth step, executing a seventh step, executing an eighth step, executing a ninth step, and executing a tenth step; wherein said first step comprises causing a network head-end to transmit protected multimedia-content to a set of terminals via a point-to-multipoint link established in a first communication-network, wherein said protected multimedia-content is synchronized with a first access-control message, wherein said first access-control message comprises a cryptogram of a control word, wherein said control word is required by a terminal to access said protected multimedia-content, wherein said terminal is a terminal from said set of terminals; wherein said second step comprises causing at least one requesting terminal from said set of terminals to receive said first access-control message and to transmit said first access-control message to a sharing server via a second communication-network, wherein said sharing server transmits said first access-control message to a first security-processor, wherein said first security-processor decrypts said cryptogram so as to recover said control word, said control word now being a decrypted control-word as a result of said cryptogram having been decrypted, wherein said security processor provides said decrypted control-word to said sharing server, wherein said sharing server provides said decrypted control-word to said at least one requesting terminal, wherein said at least one requesting terminal defines a proper subset of said set of terminals; wherein said third step comprises causing an identification device to connect said network head-end and to said sharing server via said second communication-network; wherein said fourth step comprises causing said identification device to compute a second access-control message, wherein said second access-control message comprises a cryptogram of a control word and an identification command and causing said identification device to transmit said second access-control message to said sharing server; wherein said fifth step comprises causing said sharing server to said second access-control message to said first security-processor in the same manner as said first access-control message was transmitted during said second step, wherein, in response to receiving said identification command, and as a function of an identifier of said first security-processor that has been recorded in a memory of said first security-processor, said first security-processor computes an identification datum, wherein said identification datum makes it possible to determine said identifier, wherein said first security-processor transmits said identification datum to said sharing server, and wherein said sharing server transmits said identification datum to said identification device; wherein said sixth step comprises causing said identification device to determine said identifier of said first security-processor as a function of said identification datum and to store said identifier of said first security-processor; wherein said seventh step comprises, in response to a request from said identification device, causing said network head-end to transmit, to said first security-processor, a command to suspend said first security-processor, wherein said first security-processor corresponds to said identifier that was stored during a preceding execution of said sixth step, wherein, in response, said first security-processor switches from an active state to an inactive state, wherein, when said security processor is in said active state, said security processor responds to receipt of an access-control message by decrypting a cryptogram of a control word contained in said access-control message so as to obtain a decrypted control-word and sending said decrypted control-word to said sharing server, and wherein, in said inactive state, said security processor does not return any response to said sharing server in response to receiving an access-control message; wherein said eighth step comprises causing said sharing server to detect that said first security-processor is in an inactive state and to transmit, during a subsequent execution of said second step, said access-control messages to a second security-processor instead of to said first security-processor; wherein said ninth step comprises repeating said fourth, fifth, and sixth steps with said second security-processor in place of said first security-processor so as to identify said second security-processor; and wherein said tenth step comprises upon request by said identification device, causing said network head-end to respond to identification of said second security-processor by transmitting, to said first security-processor, a restoration command for restoration of said first security-processor, wherein, in response to said restoration command, said first security-processor switches from said inactive state to said active state.

2. The method of claim 1, wherein there exists a first group of security processors, one of which is said first security-processor, wherein there exists at least one security processor that is being used in said system for providing multimedia content and that is not part of said first group, wherein said method further comprises: prior to executing said seventh step for any security processor in said first group, executing said fourth, fifth, and sixth steps for each security processor in said first group; and recording an identifier for said first group in a memory of each security processor in said first group; wherein, in said seventh step, said suspension command causes suspension of security processors in said first group, wherein said suspension command comprises an identifier for said first group, wherein said suspension command lacks individual identifiers for security processors of said first group, wherein said suspension command is transmitted to each security processor in said first group, wherein security processors in said first group, in response to said suspension command, switch from said active state to said inactive state, wherein said restoration command that is sent in said tenth step restores all security processors of said first group; wherein said restoration command comprises said identifier of said first group; wherein said restoration command lacks individual identifiers for security processors of said first group; wherein said restoration command is transmitted to each of said security processors of said first group; whereby only each of said security processors of said first group, in response, switches from said inactive state to said active state.

3. The method of claim 2, wherein recording an identifier for said first group in a memory of each security processor in said first group comprises: prior to said seventh step, upon request from said identification device, causing said network head-end to transmit a command for constructing said first group to each security processor in said first group; wherein, in response, said identifier of said first group is recorded in each security processor in said first group.

4. The method of claim 1, further comprising causing said network head-end to transmit, to said terminals, an access-control message that comprises a cryptogram of a control word.

5. The method of claim 2, further comprising causing said identification device to execute said seventh step upon determining that the number of security processors in said first group is greater than a predetermined strictly positive threshold.

6. The method of claim 2, further comprising causing said identification device to execute said seventh step upon determining that the number of security processors in said first group, when divided by a time that has elapsed since the most recent execution of said tenth step, is less than a predetermined strictly positive threshold.

7. The method of claim 2, further comprising causing said identification device to execute said seventh step after having determined that a current value of a global identification rate is less than a predetermined strictly positive threshold that is computed based on an initial value of said global identification rate, wherein said global identification rate is equal to the number of security processors in said first group divided by the time that has elapsed since the most recent execution of said tenth step.

8. The method of claim 2, wherein there exists a first time interval and a second time interval, wherein said first time interval is the elapsed time since the most recent execution of said tenth step, wherein said second time interval is a constant that is less than said first time interval, wherein said method further comprises causing said identification device to execute said seventh step after having determined that the number of security processors in said first group is greater than a predetermined strictly positive threshold.

9. The method of claim 2, wherein there exists a first time interval and a second time interval, wherein said first time interval is the elapsed time since the most recent execution of said tenth step, wherein said second time interval is a constant that is less than said first time interval, wherein said method further comprises causing said identification device to execute said seventh step after having determined that the number of security processors, when divided by said second time interval, is greater than a predetermined strictly positive threshold.

10. The method of claim 2, wherein there exists a first time interval and a second time interval, wherein said first time interval is the elapsed time since the most recent execution of said tenth step, wherein said second time interval is a constant that is less than said first time interval, wherein said method further comprises causing said identification device to execute said seventh step after having determined that a current value of a local identification rate is less than a positive threshold, wherein said local identification rate is the number of security processors divided by said second time interval, wherein said positive threshold is computed based on an initial value of said local identification rate.

11. The method of claim 1, wherein said identification device is configured to execute said tenth step as soon as a condition is satisfied, wherein said condition is selected from the group consisting of a first condition, a second condition, a third condition, and a fourth condition; wherein said first condition is the condition that the number of security processors that have been newly identified since the last implementation of said seventh step for said first security-processor is in excess of a strictly positive threshold; wherein said second condition is the condition that a current value of a global identification rate is less than a predetermined strictly positive threshold, wherein said global identification rate is a ratio in which the numerator is the number of security processors that have been newly identified since the last implementation of the seventh step for said first security-processor and the denominator is the elapsed time since the last implementation of said seventh step for said first security-processor, wherein said strictly positive threshold is selected from the group consisting of a constant value and a value that is computed based on an initial value of said global identification rate; wherein said third condition is the condition that a current number of security processors identified during the last period of a given duration is less than a predetermined strictly positive threshold, wherein said given duration is a duration within a time interval that has elapsed since the most recent execution of said seventh step, wherein said given duration is less than said time interval, wherein said strictly positive threshold is selected from the group consisting of a constant value and a value computed as a function of an initial value of said number of security processors identified during the last period of said given duration; and wherein said fourth condition is the condition that the current value of a local identification rate is less than a predetermined strictly positive threshold, wherein said local identification rate is a ratio in which the numerator is the number of number of security processors identified during the last period of a given duration and in which the denominator is a duration within a time interval that has elapsed since the most recent execution of said seventh step, wherein said duration is less than said time interval, and wherein said strictly positive threshold is selected from the group consisting of a constant value and a value computed as a function of an initial value of said number of said local identification rate.

12. The method of claim 1, wherein said fourth step further comprises causing said identification device to transmit, to said network head-end, a request to which said network head-end responds by returning, to said identification device, a result of a computation, wherein said result of said computation is selected from the group consisting of said cryptogram of said control word and said second access-control message.

13. A manufacture comprising a non-transitory computer-readable medium that includes instructions that, when executed by a microprocessor, causes execution of any of the steps recited in claim 1.

14. An apparatus comprising a network head-end for use in connection with implementation of the method of claim 1, wherein said network head-end is configured to transmit protected multimedia-content synchronized with a first access-control message and to do so to a set of terminals, on a point-to-multipoint link that is established in a first communication-network, wherein said first access-control message comprises a cryptogram of a control word that is required by any terminal to access said multimedia content, wherein said network head-end comprises a microprocessor programmed to transmit a suspension comment to said first security-processor during said seventh step and to transmit a restoration command to said first security-processor during said tenth step.

15. An apparatus comprising a security processor for use in connection with implementation of the method of claim 3, wherein said security processor is configured to decrypt said cryptogram of said control word contained in said first access-control message so as to obtain said decrypted control word, to return said decrypted control-word to said sharing server, to compute an identification datum in response to said identification command received and as a function of an identifier of said security processor recorded in a memory of said security processor, to transmit said identification datum to said sharing server, to respond to said suspension command by switching from an active state to a passive state, to respond to said restoration command by switching from said inactive state to said active state, and to process a command for constructing groups of security processors, wherein said identification datum that makes it possible to determine said identifier, and wherein, only in said active state does said security processor respond to receipt of an access-control message by decrypting said cryptogram of said control word contained in said message so as to obtain said decrypted control-word and by returning said decrypted control-word to said sharing server.

16. An apparatus comprising an identification device for use in connection with the implementation of the method of claim 1, wherein said identification device is configured to: during said third step, connect to said network head-end via a third communication network, and to said sharing server by way of the second communication-network; during said fourth step, compute a second access-control message comprising a cryptogram of a control word and an identification command, and then to transmit, to said sharing server, said second access-control message; and during said sixth step, determine, as a function of said identification datum, said identifier of said first security-processor, and to then store said identifier of said first security-processor; wherein said identification device comprises a microprocessor, wherein said microprocessor is configured to: during said seventh step, request said network head-end to transmit a command for suspending said first security-processor, said first security-processor being a security processor whose identifier was stored during a previous implementation of said sixth step; during said ninth step, repeat said fourth step and said sixth step with said second security-processor in place of said first security-processor so as to identify said second security-processor; and, during said tenth step, respond to identification at least of said second security-processor by requesting, of the network head-end, transmission of a command for restoration of the first security-processor.

\* \* \* \* \*